May 28, 1968 R. MALCOM, JR 3,384,903
EYE PROTECTIVE SPECTACLES
Filed Dec. 20, 1965
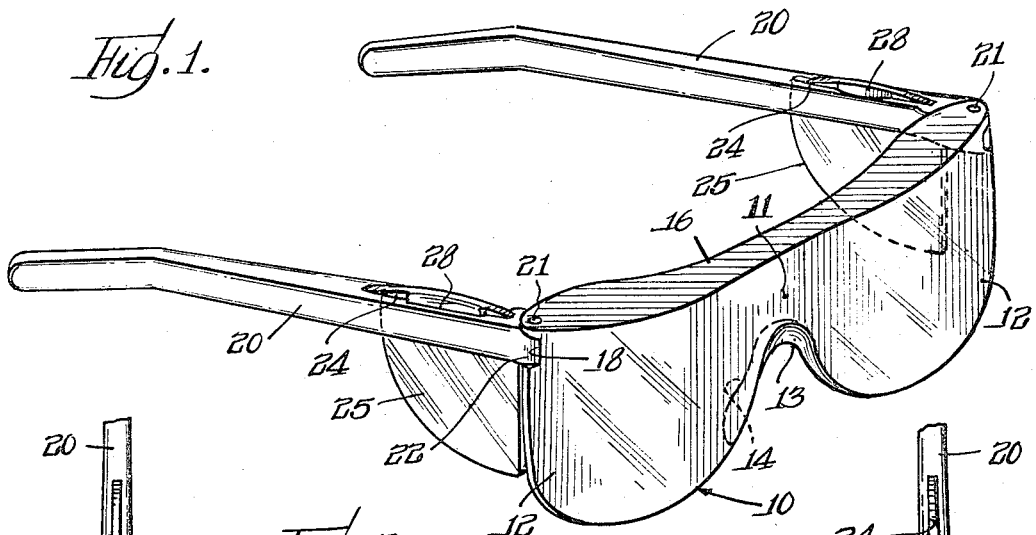
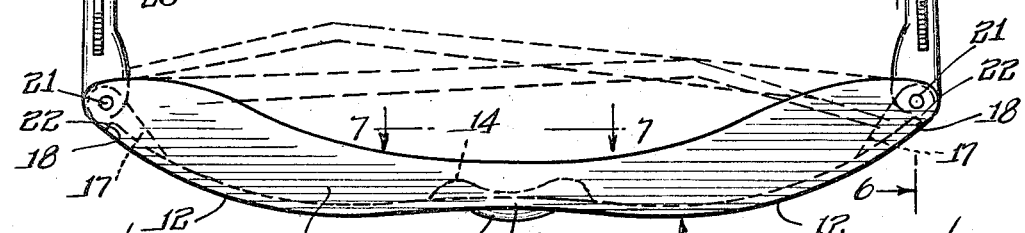
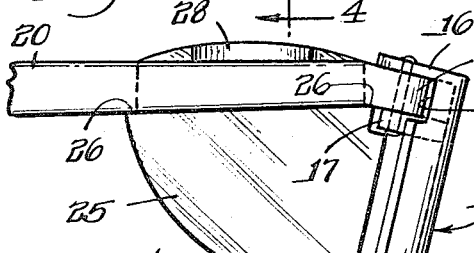
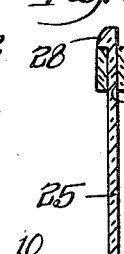
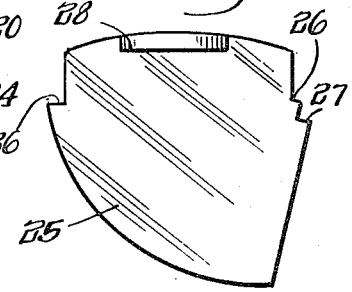
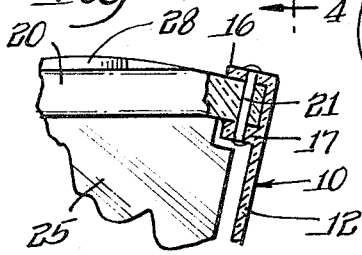
Inventor
Robert Malcom, Jr.
By Wallenstein, Spangenberg
Hattis & Strampel
attys.

United States Patent Office 3,384,903
Patented May 28, 1968

3,384,903
EYE PROTECTIVE SPECTACLES
Robert Malcom, Jr., Indian Rocks Beach, Fla., assignor to Cesco Safety Products, Inc., Chicago, Ill., a corporation of Illinois
Filed Dec. 20, 1965, Ser. No. 514,903
5 Claims. (Cl. 2—14)

ABSTRACT OF THE DISCLOSURE

Eye protective spectacles which comprises a single piece transparent front panel adapted to be worn by the wearer in front of the eyes, temples pivotally connected to the single piece transparent front panel, an integral flanged nose receiving recess in the front panel, an integral rearwardly directed overhang portion on the front panel, and identically shaped side shields detachably secured to the temples. The front panel has no curvature in the vertical direction but it has an undulating curvature in the lateral direction.

---

The principal object of this invention is to provide improved eye protective spectacles which may be worn in dangerous environments where damage to the eyes might occur, for protecting the eyes of the wearer, which may be worn, if desired, over prescription glasses, which eliminate possible prism and indirect reflection effects, which may optionally be provided with desired detachable side shields for providing side protection for the eyes, which are inexpensive to manufacture and assemble, and wherein stocking problems with respect to the spectacles and side shields are maintained at a minimum.

Further objects of this invention reside in the details of construction of the eye protective spectacles and in the cooperative relationships between the component parts thereof.

Other objects and advantages of this invention will become apparent to those skilled in the art upon reference to the accompanying specification, claims and drawing in which:

FIG. 1 is a perspective view of the eye protective spectacles of this invention with the temples thereof extended rearwardly;

FIG. 2 is a top plan view of the eye protective spectacles illustrated in FIG. 1;

FIG. 3 is a partial end view of the spectacles looking from the left of FIGS. 1 and 2;

FIG. 4 is a vertical sectional view taken substantially along the line 4—4 of FIG. 3;

FIG. 5 is a side elevational view of one of the side shields;

FIG. 6 is a partial sectional view taken substantially along the line 6—6 of FIG. 2; and FIG. 7 is a partial rear elevational view taken substantially along the line 7—7 of FIG. 2.

The protective spectacles of this invention include a single piece transparent front panel generally designated at 10. This panel may be suitably molded from an optical synthetic plastic material, such as, polystyrene or the like. The front panel 10 is transparent and, if desired, may be provided with a ground finish, and it has an undulating curvature in the lateral direction as more clearly illustrated in FIG. 2, there being no curvature in the vertical direction. The single piece transparent front panel 10 may be clear or tinted if desired. The panel 10 includes a central concavo-convex portion 11 having the concavo face of said portion facing forwardly. The panel 10 also has a concavo-convex portion 12 laterally of each side of the central portion 11, these concavo-convex portions 12 merging with the central portion 11 and having the convex faces thereof facing forwardly. By reason of this undulating curvature of the front panel 10 possible prism effects, such as encountered in spectacles having a single flat bend, or flat lenses or compound curvatures molded in the frame, are eliminated. The central portion 11 of the front panel 10 is centrally provided with a nose receiving recess 13 which is suitably flanged, as indicated at 14, so as to fit easily on the nose of the wearer.

The top edge of the panel 10 is also provided with a rearwardly directed overhang portion 16, this portion 16 being integrally formed with the panel portions 11 and 12. This rearwardly directed overhang portion 16 may rest against the forehead of the wearer and in the case where the eye protective spectacles are worn over the usual prescription glasses, the overhang portion 16 may ride upon such glasses and decreases or eliminate pressure on the nose at the nose recess 13. The overhang portion 16 may also be treated as by sandblasting or the like to render the same non-transparent to reduce the possibility of back reflection of overhead reflected light from striking the rear of the front panel and reflecting into the wearer's eyes. The outer ends of the front panel 10 are provided with rearwardly extending flanges 17 below and parallel to the overhang portion 16, and between the overhang portion 16 and the flanges 17 the side edges of the front panel 10 are provided with notches 18.

The eye protective spectacles also include a pair of temples 20 having the forward ends of the temples received between the overhang portion 16 and the flanges 17. Pins 21 extend through the forward ends of the temples and the overhang portion 16 and flanges 17 for pivotally connecting the temples 20 to the front panel. The temples may be swung from a collapsed position at the rear of the panel 10 as illustrated by broken lines in FIG. 2 to a rearwardly extended position as shown in full lines in FIGS. 1 and 2. The forward ends of the temples 20 are provided with projections 22 which are adapted to engage the edges of the notches 18 for limiting the rearward and outward movement of the temples 20. The temples 20 are preferably formed of a suitable resilient synthetic plastic material, such as, polystyrene or the like.

The temples 20 adjacent to where they are pivotally connected to the front panel 10 are provided with vertical slots 24 therethrough for the purpose of receiving side shields 25. The side shields 25 are identically shaped and are substantially flat so that they may be received in the slots 24 in either of the temples 20. Referring more particularly to FIG. 5, the side shields 25 each include a pair of shoulders 26 which are adapted to engage the bottom edge of the temples 20 and also a recess 27 to provide clearance for the flanges 17 on the panel 10. The side shields are inserted upwardly through the slots 24 in the temples 20 until the shoulders 26 engage the bottom edges of the temples 20. The top of the side shields 25 is provided with a lateral boss 28 and when the side shields 25 are inserted through the slot 24 in the temples 20, the slots are expanded by the lateral boss 28, this being permitted by the resiliency of the temples 20. When the side shields 25 are fully inserted in the slots 24 in the temples 20, the lateral boss 28 completely passes through the slot 24 and engages the top edge of the temples 20 for detachably locking the side shields 25 in place in the temples. To remove the side shields from the temples the slots 24 in the temples 20 are spread to accommodate the lateral bosses 28 whereupon the side shields may be readily downwardly removed from the temples. Because the side shields are identically shaped and are substantially flat, either side shield may be detachably secured in either temple and as a result, it is not necessary to stock right and left hand side shields. The side shields may be made of any suitable material such as a suitable synthetic plastic or the like and they may be clear or tinted, or transparent, translucent or opaque, or perforated or solid. Thus, a wide variety of side shields may be detachably secured to the temples of the eye protective spectacles and it is not necessary to stock spectacles having different kinds of side shields.

While for purposes of illustration one form of this invention has been disclosed, other forms thereof may become apparent to those skilled in the art upon reference to this disclosure and, therefore, this invention is to be limited only by the scope of the appended claims.

What is claimed is:

1. Eye protective spectacles comprising a single piece transparent front panel adapted to be worn by the wearer in front of the eyes, said transparent panel having no curvature in the vertical direction and an undulating curvature in the lateral direction and including a central concavo-convex portion having the concavo face of said portion facing forwardly and a concavo-convex portion laterally of each side of the central portion and merging therewith and having the convex faces of said laterally disposed portions facing forwardly, and temples pivotally connected to said single piece transparent front panel and extendable rearwardly from a collapsed position adjacent the rear of said front panel to an extended position for holding the protective spectacles in place on the wearer, said temples having vertical slots therethrough adjacent to the pivotal connections of the temples with the front panel, a pair of identically shaped substantially flat side shields, and means for inserting and detachably securing either side shield in the slot of either temple.

2. Eye protective spectacles comprising a single piece transparent front panel adapted to be worn by the wearer in front of the eyes, temples pivotally connected to said front panel and extendable rearwardly from a collapsed position adjacent the rear of said front panel to an extended position for holding the protective spectacles in place on the wearer, said temples having vertical slots therethrough adjacent to the pivotal connections of the temples with the front panel, a pair of identically shaped substantially flat side shields, and means for inserting and detachably securing either side shield in the slot of either temple.

3. Eye protective spectacles as defined in claim 2 wherein said substantially flat side shields are insertable through said slots in said temples and are provided with detent means for detachably maintaining said side shields in said slots.

4. Eye protective spectacles as defined in claim 3 wherein said detent means include shoulders on the side shields engaging one edge of the temples for limiting the extent of insertion of said side shields in said slots in the temples and bosses on said side shields which pass through the slots in the temples and engage the other edge of the temples when the shoulders of the side shields engage said first edge of the temples.

5. Eye protective spectacles as defined in claim 2 wherein said identically shaped side shields may be clear or tinted, or transparent, translucent or opaque, or perforated or solid.

References Cited

UNITED STATES PATENTS

| 2,224,784 | 12/1940 | Goldschmid | 2—13 |
| 2,472,731 | 6/1949 | Splaine | 2—14.5 X |
| 2,506,956 | 5/1950 | Gomez | 2—14.21 X |
| 2,590,397 | 3/1952 | Gay et al. | 2—14.4 |
| 2,628,352 | 2/1953 | Astruck | 2—14.21 |
| 2,824,309 | 2/1958 | Fleming | 2—14.9 |
| 3,204,252 | 9/1965 | Herrington | 2—13 |

FOREIGN PATENTS

| 600,726 | 4/1948 | Great Britain. |
| 398,881 | 9/1933 | Great Britain. |
| 651,597 | 8/1958 | Canada. |
| 618,827 | 3/1961 | Italy. |

HERBERT F. ROSS, *Primary Examiner.*